United States Patent [19]

Baierweck et al.

[11] Patent Number: 5,482,985
[45] Date of Patent: Jan. 9, 1996

[54] HALOGEN-FREE FLAMEPROOFED THERMOPLASTIC POLYAMIDE MOLDING MATERIALS

[75] Inventors: Petra Baierweck, Boehl-Iggelheim; Brigitte Gareiss, Ludwigshafen; Karlheinz Ulmerich, Lambsheim; Michael Gall, Mannheim; Manfred Koetting, Mutterstadt, all of Germany

[73] Assignee: BASF Aktiengesellschaft, Ludwigshafen, Germany

[21] Appl. No.: 409,961

[22] Filed: Mar. 24, 1995

Related U.S. Application Data

[63] Continuation of Ser. No. 207,094, Mar. 8, 1994, abandoned.

[30] Foreign Application Priority Data

Mar. 11, 1993 [DE] Germany ............... 43 07 682.3

[51] Int. Cl.$^6$ ............... C08K 5/34; C08K 3/22
[52] U.S. Cl. ............... 524/101; 524/436; 524/494
[58] Field of Search ............... 524/101, 436, 524/494

[56] References Cited

U.S. PATENT DOCUMENTS

| | | | |
|---|---|---|---|
| 4,098,762 | 7/1978 | Miyata et al. | 106/306 |
| 4,298,518 | 11/1981 | Ohmura et al. | |
| 4,314,927 | 2/1982 | Theysohn et al. | 524/100 |
| 4,963,610 | 10/1990 | Schmid et al. | 524/436 |

FOREIGN PATENT DOCUMENTS

| | | |
|---|---|---|
| 019768 | 5/1983 | European Pat. Off. . |
| 122697 | 10/1984 | European Pat. Off. . |
| 278555 | 8/1988 | European Pat. Off. . |
| 335165 | 10/1989 | European Pat. Off. . |
| 571241 | 11/1993 | European Pat. Off. . |
| 2624065 | 12/1976 | Germany . |
| 2740092 | 3/1978 | Germany . |

OTHER PUBLICATIONS

Japanese Abstract, 51/68651.
Japanese Abstract 53/15250.
Japanese Abstract 54/16565.
Japanese Abstract 54/118454.

*Primary Examiner*—Kriellion S. Morgan
*Attorney, Agent, or Firm*—Keil & Weinkauf

[57] ABSTRACT

Flameproofed thermoplastic polyamide molding materials contain

A) from 40 to 98% by weight of a thermoplastic polyamide,
B) from 0.5 to 30% by weight of melamine cyanurate,
C) from 0.5 to 50% by weight of magnesium hydroxide,
D) from 1 to 50% by weight of a fibrous or particulate filler or of a mixture thereof which differs from B) and C) and
E) from 0 to 30% by weight of conventional additives or processing assistants.

7 Claims, No Drawings

HALOGEN-FREE FLAMEPROOFED THERMOPLASTIC POLYAMIDE MOLDING MATERIALS

This application is a continuation of application Ser. No. 08/207,094, filed on Mar. 8, 1994, now abandoned.

The present invention relates to flameproofed thermoplastic molding materials containing A) from 40 to 98% by weight of a thermoplastic polyamide, B) from 0.5 to 30% by weight of melamine cyanurate, C) from 0.5 to 50% by weight of magnesium hydroxide, D) from 1 to 50% by weight of a fibrous or particulate filler or of a mixture thereof which differs from B) and C) and E) from 0 to 30% by weight of conventional additives or processing assistants.

The present invention furthermore relates to the use of the novel molding materials for the production of fibers, films and moldings and to the moldings obtainable therefrom.

JP-A 51/68651, DE-A 26 24 065 and EP-A 335 165 disclose the preparation of magnesium hydroxide and its use for flameproofing thermoplastics.

Melamine cyanurate as a flameproofing agent for polyamides, with or without fillers, is disclosed in JA-A 53/51250, JP-A 54/118454, JP-A 54/16565 and DE-A 27 40 092.

The combination of red phosphorus with melamine cyanurate for flameproofing polyamides is disclosed in EP-A 19 768.

Such polyamides are only of limited use in particular for outdoor applications, since the natural color of the red phosphorus does not permit any desired colors, and white or natural-colored moldings cannot be produced even with the addition of white pigments or colorants.

Polyamides which are treated with mineral fillers can be flameproofed with melamine cyanurate. However, moldings obtained from these molding materials have unsatisfactory mechanical properties, in particular unsatisfactory rigidity and strength. For certain applications, it is also necessary to pass the glowing wire test according to IEC 336 and IEC 1058 at above 650° C. without flame formation. These preconditions are not met by mineral-filled polyamides treated with melamine cyanurate.

The addition of glass fibers for improving the mechanical properties generally has a disadvantageous effect on the flameproof properties since, owing to the wick effect, glass fibers result in a dramatic deterioration in the flame resistance. Accordingly, glass fiber-containing polyamides cannot be flameproofed with melamine cyanurate.

It is an object of the present invention to provide flameproofed thermoplastic molding materials which have good mechanical properties and good flame resistance. In particular, the addition of glass fibers should result in flame resistance which passes the glowing wire test at above 650° C. without flame formation. In addition, the moldings should have good electrical properties.

We have found that this object is achieved by the molding materials defined at the outset.

Preferred embodiments are described in the subclaims.

The novel molding materials contain, as component A), from 40 to 98, preferably from 50 to 89, in particular from 60 to 75, % by weight of thermoplastic polyamide.

The polyamides of the novel molding materials generally have a relative viscosity $\eta_{rel}$ of from 1.7 to 5.0, determined in a 1% strength by weight solution in 96% strength by weight sulfuric acid at 25° C., corresponding to a K value (according to Fikentscher) of from 50 to 96. Polyamides having a relative viscosity of from 2.3 to 4.5, in particular from 2.5 to 4.0, are preferably used.

Semicrystalline or amorphous resins having a weight average molecular weight of at least 5000, as described, for example, in U.S. Pat. Nos. 2,071,250, 2,071,251, 2,130,523, 2,130,948, 2,241,322, 2,312,966, 2,512,606 and 3,393,210, are preferred.

Examples of these are polyamides which are derived from lactams having 7 to 13 ring members, such as polycaprolactam, polycapryllactam and polylaurolactam, and polyamides which are obtained by reacting dicarboxylic acids with diamines.

The dicarboxylic acids which may be used are alkanedicarboxylic acids of 6 to 12, in particular 6 to 10, carbon atoms and aromatic dicarboxylic acids. Adipic acid, azelaic acid, sebacic acid, dodecanedioic acid and terephthalic and/or isophthalic acid may be mentioned here merely as examples.

Particularly suitable diamines are alkanediamines of 6 to 12, in particular 6 to 8 carbon atoms and m-xylylenediamine, di-(4-aminophenyl)-methane, di-(4-aminocyclohexyl)-methane, 2,2-di-(4-aminophenyl)-propane and 2,2-di-(4-aminocyclohexyl)-propane.

Preferred polyamides are polyhexamethyleneadipamide, polyhexamethylenesebacamide and polycaprolactam.

Other examples of polyamides are those which are obtainable, for example, by condensation of 1,4-diaminobutane with adipic acid at elevated temperatures (polyamide 4,6). Preparation processes for polyamides having this structure are described in, for example, EP-A 38 094, EP-A 38 582 and EP-A 39 524.

Polyamides which are obtainable by copolymerization of two or more of the abovementioned monomers, or mixtures of a plurality of the polyamides in any ratio, are also suitable.

Such partly aromatic, semicrystalline copolyamides are composed of:

$A_1$) 20–90% by weight of units which are derived from terephthalic acid and hexamethylenediamine, $A_2$) 0–50% by weight of units which are derived from ε-caprolactam, $A_3$) 0–80% by weight of units which are derived from adipic acid and hexamethylenediamine and $A_4$) 0–40% by weight of further polyamide-forming monomers, the amount of component ($A_2$) or ($A_3$) or ($A_4$) or of a mixture thereof being at least 10% by weight.

Component $A_1$) contains 20–90% by weight of units which are derived from terephthalic acid and hexamethylenediamine.

In addition to the units which are derived from terephthalic acid and hexamethylenediamine, the copolyamides contain units which are derived from ε-caprolactam and/or units which are derived from adipic acid and hexamethylenediamine and/or units which are derived from further polyamide-forming monomers.

The amount of units which are derived from ε-caprolactam is not more than 50, preferably from 20 to 50, in particular from 25 to 40, % by weight, while the amount of units which are derived from adipic acid and hexamethylenediamine is up to 80, preferably from 30 to 75, in particular from 35 to 60, % by weight.

The copolyamides may also contain both units of ε-caprolactam and units of adipic acid and hexamethylenediamine; in this case, it is advantageous if the amount of units which are free of aromatic groups is at least 10, preferably at least 20, % by weight. The ratio of the units which are derived from ε-caprolactam and from adipic acid and hexamethylenediamine is not subject to any special restriction in this case.

Polyamides having from 50 to 80, in particular from 60 to 75, % by weight of units which are derived from terephthalic acid and hexamethylenediamine (units $A_1$)) and from 20 to 50, preferably from 25 to 40, % by weight of units which are derived from ε-caprolactam (units $A_2$)) have proven particularly advantageous for many intended uses.

In addition to the units $A_1$) to $A_3$) described above, the partly aromatic copolyamides may contain up to 40, preferably 10–30, in particular 20–30, % by weight of further polyamide-forming monomers $A_4$), as known for other polyamides.

Aromatic dicarboxylic acids $A_4$) are of 8 to 16 carbon atoms. Examples of suitable aromatic dicarboxylic acids are isophthalic acid, substituted terephthalic and isophthalic acids, such as 3-tert-butylisophthalic acid, polynuclear dicarboxylic acids, e.g. 4,4'- and 3,3'-diphenyldicarboxylic acid, 4,4'- and 3,3'-diphenylmethanedicarboxylic acid, 4,4'- and 3,3'-dicarboxydiphenyl sulfone, 1,4- and 2,6-naphthalenedicarboxylic acid and phenoxyterephthalic acid, isophthalic acid being particularly preferred.

Further polyamide-forming monomers $A_4$) may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. As suitable monomers of these types, suberic acid, azelaic acid and sebacic acid may be mentioned here merely as typical aliphatic dicarboxylic acids, 1,4-butanediamine, 1,5-pentanediamine, piperazine, 4,4'-diaminodicyclohexylmethane, 2,2-(4,4'-diaminodicyclohexyl)-propane or 3,3'-dimethyl-4,4'-diaminodicyclohexylmethane as typical diamines and caprylactam, enantholactam, ω-aminoundecanoic acid and laurolactam as typical lactams or aminocarboxylic acids.

The following compositions of component (A) are particularly preferred:

$A_1$) from 65 to 85% by weight of units which are derived from terephthalic acid and hexamethylenediamine and $A_4$) from 15 to 35% by weight of units which are derived from isophthalic acid and hexamethylenediamine or $A_1$) from 50 to 70% by weight of units which are derived from terephthalic acid and hexamethylenediamine and $A_3$) from 10 to 20% by weight of units which are derived from adipic acid and hexamethylenediamine and $A_4$) from 20 to 30% by weight of units which are derived from isophthalic acid and hexamethylenediamine.

If component ($A_4$) contains symmetric dicarboxylic acids in which the carboxyl groups are in the para position, it is advisable to combine these with ($A_1$) and ($A_2$) or ($A_1$) and ($A_3$) to form ternary copolyamides, since otherwise the copolyamide has too high a melting point and only melts with decomposition, which is undesirable.

Furthermore, partly aromatic copolyamides which have proven particularly advantageous are those whose triamine content is less than 0.5, preferably less than 0.3, % by weight.

Partly aromatic copolyamides prepared by most known processes (cf. U.S. Pat. No. 4,603,166) have triamine contents which are greater than 0.5% by weight, which leads to a deterioration in the product quality and to problems in the continuous preparation. A triamine which causes these problems is in particular dihexamethylenetriamine, which is formed from the hexamethylenediamine used in the preparation.

The preparation of the preferred partly aromatic copolyamides having a low triamine content can be carried out by the processes described in EP-A 129 195 and 129 196.

The novel thermoplastic molding materials contain, as component B), from 0.5 to 30, preferably from 1 to 20, in particular from 5 to 20, % by weight of melamine cyanurate as a flameproofing agent.

The melamine cyanurate used according to the invention (component B) is a reaction product of preferably equimolar amounts of melamine (formula I) and cyanuric acid or isocyanuric acid (formulae IIa and IIb)

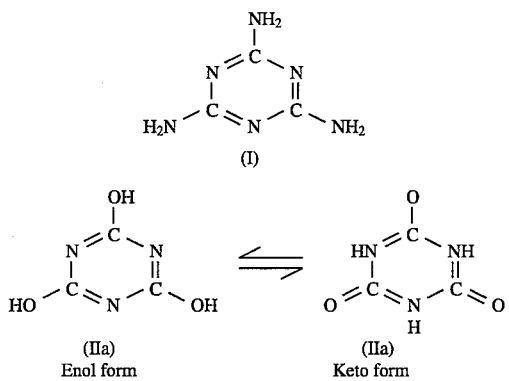

(IIa) Enol form      (IIa) Keto form

It is obtained, for example, by reacting aqueous solutions of the starting compounds at from 90° to 100° C. The commercially available product is a white powder having a median particle size $d_{50}$ of 69 μm.

The novel molding materials contain, as component C), from 0.5 to 50, preferably from 5 to 40, in particular from 10 to 30, % by weight of a magnesium hydroxide as a flameproofing agent.

The commercially available products are lamellar solids and generally have a specific surface area, determined by the BET method according to DIN 66 131, of from 5 to 100, preferably from 5 to 20, in partiuclar from 8 to 12, m²/g. The mean particle size is in general from 0.4 to 20 μm, preferably from 0.5 to 2 μm, in particular from 0.8 to 1.5 μm.

Preparation processes are known to the skilled worker, so that further details are unnecessary.

Preferred flameproofing agents in the novel molding materials are magnesium hydroxides which have been pretreated on the surface with a silane compound.

By treatment with the silane, it is possible to achieve the desired V-O classification according to UL 94 with a smaller amount of Mg(OH)$_2$. In addition, more advantageous mechanical properties (in particular impact strength) of the moldings can be achieved.

Suitable silane compounds are those of the general formula III $$(X-CH_2)_n)_K-Si-(O-C_mH_{2m+1})_{4-K} \qquad \text{III}$$

where

X is NH$_2$—,

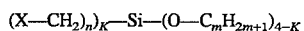

or HO—, n is an integer of from 2 to 10, preferably 3 or 4, m is an integer of from 1 to 5, preferably 1 or 2, and k is an integer of from 1 to 3, preferably 1.

Preferred silane compounds are aminopropyltrimethoxysilane, aminobutyltrimethoxysilane, aminopropyltriethoxysilane, aminobutyltriethoxysilane and the corresponding silanes in which X is glycidyl.

The silane compounds are used in general in amounts of from 0.05 to 5, preferably from 0.5 to 1.5, in particular from 0.8 to 1, % by weight (based on C)) for surface coating.

The novel thermoplastic molding materials contain, as a further component, from 1 to 50, preferably from 15 to 35, in particular from 10 to 20, % by weight of a fibrous or particulate filler (component D)) or a mixture thereof which differs from B) and C).

Preferred fibrous reinforcing materials are carbon fibers, potassium titanate whiskers, Aramid fibers and particularly preferably glass fibers. When glass fibers are used, they may be treated with a size and an adhesion promoter to improve the compatibility with the thermoplastic polyamide (A). In general, the glass fibers used have a diameter of from 6 to 20 μm.

These glass fibers may be incorporated in the form of both short glass fibers and rovings. In the finished injection molded part, the average length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates such as wollastonite.

Preferred combinations of fillers are, for example, 20% by weight of glass fibers with 15% by weight of wollastonite and 15% by weight of glass fibers with 15% by weight of wollastonite.

In addition to the essential components A) to D), the novel molding materials may contain conventional additives and processing assistants E). The amount of these is in general up to 30, preferably up to 15, % by weight, based on the total weight of components (A) to (E).

Examples of conventional additives are stabilizers and antioxidants, heat stabilizers and UV stabilizers, lubricants and mold release agents, dyes and pigments and plasticizers.

Pigments and dyes are generally present in amounts of up to 1, preferably up to 0.6, in particular up to 0.4, % by weight. Pigments of this type are generally known (cf., for example, R. Gächter and H. Müller, Taschenbuch der Kunststoffadditive, Carl Hanser Verlag, 1983, pages 494 to 510). A first preferred group of pigments comprises white pigments, such as zinc oxide, zinc sulfide, white lead (2.PbCO$_3$.Pb(OH)$_2$), lithopone, antimony white and titanium dioxide. Of the two most commonly used crystal modifications (rutile and anatase type) of titanium dioxide, the rutile form is used in particular for coloring the novel molding materials.

Black pigments which can be used according to the invention are iron oxide black, (Fe$_3$O$_4$), spinel black (Cu,(Cr,Fe)$_2$O$_4$), manganese black (mixture of manganese dioxide, silica and iron oxide), cobalt black and antimony black and particularly preferably carbon black, which is generally used in the form of furnace black or gas black (cf. G. Benzing, Pigmente für Anstrichmittel, Expert-Verlag (1988), page 78 et seq.).

Antioxidants and heat stabilizers which may be added to the thermoplastic materials according to the invention are, for example, halides of metals of group I of the Periodic Table of Elements, e.g. sodium halides, potassium halides or lithium halides, if necessary in combination with copper(I) halides, e.g. chlorides, bromides or iodides. Zinc fluoride and zinc chloride may also be used. Sterically hindered phenols, hydroquinones, substituted members of this group, secondary aromatic amines, if necessary in combination with phosphorus-containing acids or salts thereof, and mixtures of these compounds, preferably in concentrations of up to 1% by weight, based on the weight of the mixture, may also be used.

Examples of UV stabilizers are various substituted resorcinols, salicylates, benzotriazoles and benzophenones, which are generally used in amounts of up to 2% by weight.

Lubricants and mold release agents, which as a rule are added to the thermoplastic material in amounts of up to 1% by weight, are stearic acid, stearyl alcohol, alkyl stearates and stearamides as well as esters of pentaerythritol with long-chain fatty acids. Salts of calcium, of zinc or of aluminum with stearic acid and dialkyl ketones, e.g. distearyl ketone, may also be used.

The novel thermoplastic molding materials may contain, as component (E), from 0 to 30, preferably from 5 to 20, in particular from 5 to 15, % by weight of an elastomeric polymer. Preferred elastomeric polymers are polymers based on olefins, which are composed of the following components:

$e_1$) 40–100% by weight of at least one α-olefin of 2 to 8 carbon atoms, $e_2$) 0–50% by weight of a diene, $e_3$) 0–45% by weight of a $C_1$–$C_{12}$-alkyl ester of acrylic acid or methacrylic acid or a mixture of such esters, $e_4$) 0–40% by weight of an ethylenically unsaturated mono- or dicarboxylic acid or a functional derivative of such an acid, $e_5$) 0–40% by weight of an epoxy-containing monomer and $e_6$) 0–5% by weight of other monomers capable of free radical polymerization, with the proviso that component (E) is not an olefin homopolymer.

A first preferred group comprises the ethylene/propylene (EPM) or ethylene/propylene/diene (EPDM) rubbers, which preferably have a ratio of ethylene units to propylene units of from 40:60 to 90:10.

The Mooney viscosities (MLI+4/100° C.) of such, preferably uncrosslinked EPM or EPDM rubbers (gel contents generally below 1% by weight) are preferably from 25 to 100, in particular from 35 to 90 (measured using the large rotor after a running time of 4 minutes at 100° C. according to DIN 53 523).

EPM rubbers generally have virtually no more double bonds, whereas EPDM rubbers may have from 1 to 20 double bonds per 100 carbon atoms.

Examples of diene monomers $e_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene, 2-isopropenyl-5-norbornene, and tricyclodienes, such as 3-methyltricyclo[5.2.1.0.2.6]-3,8-decadiene or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15, % by weight, based on the total weight of the olefin polymer.

EPM or EPDM rubbers may preferably also be grafted with reactive carboxylic acids or derivatives thereof. Particular examples of these are acrylic acid, methacrylic acid and derivatives thereof, as well as maleic anhydride.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

In principle, all primary and secondary $C_1$–$C_{18}$-alkyl esters of acrylic acid or methacrylic acid are suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The proportion of the methacrylates and acrylates $e_3$) in the olefin polymers is 0–60, preferably 10–50, in particular 30–45, % by weight.

The olefin polymers may also contain monomers having acidic functional groups and/or latent acidic functional groups and obtained from ethylenically unsaturated mono- or dicarboxylic acids $e_4$) or epoxy-containing monomers $e_5$) instead of the esters $e_3$) or in addition to them.

Examples of monomers $e_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Monomers having latent acidic functional groups are to be understood as meaning those compounds which form free acid groups under the polymerization conditions or during the incorporation of the olefin polymers into the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tert-butyl methacrylate.

The monomers having acidic functional groups or latent acidic functional groups and the epoxy-containing monomers are preferably incorporated into the olefin polymers by adding compounds of the general formulae I–IV to the monomer mixture.

$$R^1C(COOR^2)=C(COOR^3)R^4 \quad (I)$$

$$\begin{array}{c} R^1 \diagdown \quad \diagup R^4 \\ C = C \\ | \quad \quad | \\ CO \diagdown \quad \diagup CO \\ O \end{array} \quad (II)$$

$$CHR^7=CH-(CH_2)_m-O-(CHR^5)_n-\overset{O}{\overset{\diagup \diagdown}{CH-CHR^5}} \quad (III)$$

$$CH_2=CR^9-COO-(CH_2)_n-\overset{}{\underset{O}{\diagdown \diagup}}CH-CHR^8 \quad (IV)$$

where $R^1$–$R^9$ are each hydrogen or alkyl of 1 to 6 carbon atoms, m is an integer of from 0 to 20 and n is an integer of from 0 to 10.

$R^1$–$R^7$ are each preferably hydrogen, m is preferably 0 or 1 and n is preferably 1. The corresponding compounds are maleic acid, fumaric acid, maleic anhydride, $e_4$) or alkenyl glycidyl ether or vinyl glycidyl ether $e_5$).

Preferred compounds of the formulae I, II, III and IV are maleic acid and maleic anhydride as component $e_4$) and epoxy-containing esters of acrylic acid and/or methacrylic acid, glycidyl acrylate and glycidyl methacrylate being particularly preferred (as component $e_5$)).

The amount of components $e_4$) and $e_5$) is in each case from 0.07 to 40, in particular from 0.1 to 20, and particularly preferably from 0.15 to 15, % by weight, based on the total weight of the olefin polymers.

Particularly preferred olefin polymers are those comprising from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

For example, vinyl esters and vinyl ethers are suitable as other monomers $e_6$).

The ethylene copolymers described above can be prepared by conventional processes, preferably by random copolymerization under high pressure and at elevated temperature.

The melt flow index of the ethylene copolymers is in general from 1 to 80 g/10 min (measured at 190° C. and under a load of 2.16 kg).

In addition to the above preferred elastomeric polymers based on olefins, suitable elastomers (E) are, for example, emulsion polymers, the preparation of which is described, for example, in Houben-Weyl, Methoden der organischen Chemie, Volume XII. I (1961) and by Blackley in the monograph Emulsion Polymerization.

In principle, random elastomers or those having a shell structure may be used. The shell-like structure is determined by the order of addition of the individual monomers.

Examples of monomers for the preparation of elastomers are acrylates, such as n-butyl acrylate and 2-ethylhexyl acrylate, corresponding methacrylates and mixtures thereof. These monomers may be copolymerized with further monomers, such as styrene, acrylonitrile, vinyl ethers and further acrylates or methacrylates, such as methyl methacrylate, methyl acrylate, ethyl acrylate and propyl acrylate.

The use of emulsion polymers which have reactive groups at the surface is advantageous. Such groups are, for example, epoxy, carboxyl, latent carboxyl, amino or amido.

The graft monomers described in EP-A 208 187 are also suitable for the introduction of reactive groups at the surface.

The emulsion polymers may furthermore be completely or partially crosslinked. Examples of crosslinking monomers are buta-1,3-diene, divinylbenzene, diallyl phthalate and dihydrodicyclopentadienyl acrylate, as well as the compounds described in EP-A 50 265.

Graft-linking monomers, i.e. monomers having two or more polymerizable double bonds which react at different rates in the polymerization, may also be used.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate or the corresponding monoallyl compounds of these dicarboxylic acids. There is also a large number of other suitable graft-linking monomers; for further details, reference may be made, for example, to U.S. Pat. No. 4,148,846.

In general, the proportion of these crosslinking monomers in component (E) is up to 5, preferably not more than 3, % by weight, based on (E).

Examples of preferred emulsion polymers are n-butyl acrylate/(meth)acrylic acid copolymers, n-butyl acrylate/ glycidyl acrylate or n-butyl acrylate/glycidyl methacrylate copolymers and graft polymers having an inner core of n-butyl acrylate and an outer shell of the abovementioned copolymers.

The elastomers (E) described may also be prepared by other conventional processes, for example by suspension polymerization.

The novel thermoplastic molding materials may be prepared by conventional processes, by mixing the starting components in a conventional mixing apparatus, such as an extruder, a Brabender mill or a Banbury mill, and then carrying out extrusion. After the extrusion, the extrudate is cooled and comminuted.

The novel molding materials have good electrical properties (creep resistance and thermoconductivity) and very good flameproof properties (in particular the glowing wire test is passed at above 650° C. without flame formation). In addition, moldings have good mechanical properties, such as rigidity, modulus of elasticity and impact strength. The low coefficient of linear expansion is particularly advantageous for processing.

They are therefore suitable for the production of fibers, films and moldings which are used in particular in the electrical industry.

EXAMPLES

The following components were used:
Component A/1

Component D/1

Glass fibers having a mean diameter of 10 μm; surface treated with aminosilane.

Component D/2

Wollastonite having a median particle size ($d_{50}$) of 3.5 μm.

Preparation of molding materials

Components A) to F) were compounded in a twin-screw extruder (120 rpm; 30 kg/h) at 280° C., the mixture was extruded and the extrudate was cooled in a water bath and granulated. The granules were dried at 80° C. under reduced pressure and processed at 280° C. on an injection molding machine to give standard test specimens.

The creep resistance (CTI) was determined according to DIN 112, ASTM-D 3638.

The tensile strength was determined according to DIN 53 455, the modulus of elasticity according to DIN 54 457, the impact strength according to DIN 53 453 and the elongation at break according to ISO 527.

The glowing wire test was carried out according to IEC 695–21, 1, 2 and 3 mm corresponding to the thickness of the test specimen.

The composition of the molding materials and the results of the measurements are shown in the Table.

TABLE

| Composition [% by weight] | 1 *) | 2 *) | 3 *) | 4 *) | 5 | 6 | 7 | 8 |
|---|---|---|---|---|---|---|---|---|
| A/2 | 70 | 60 | 70 | 55 | 65 | — | 55 | 50 |
| A/1 | — | — | — | — | — | 65 | — | — |
| B | — | . | 15 | 15 | 10 | 10 | 10 | 15 |
| C | 30 | 25 | — | — | 15 | 15 | 20 | 15 |
| D/1 | — | 15 | — | 15 | 10 | 10 | 15 | 20 |
| D/2 | — | — | 15 | 15 | — | — | — | — |
| Glowing wire test | | | | | | | | |
| 750, 850, 960° C. (3 mm) | | | +, +, + | +, −, − | +, +, + | +, +, + | +, +, + | +, +, + |
| 750, 850, 960° C. (2 mm) | | | +, +, + | −, −, − | +, +, + | +, +, + | +, +, + | +, +, + |
| 750, 850, 960° C. (1 mm) | | | +, +, + | −, −, − | +, +, + | +, +, + | +, +, + | +, +, + |
| Flame formation at 750° C. (1, 2, 3 mm) | yes | yes | no | yes | no | no | no | no |
| Modulus of elasticity (N/mm$^2$) | | | 4 800 | 7 100 | 6 800 | 7 000 | 9 000 | 10 500 |
| Tensile strength (N/mm$^2$) | | | 85 | 1 | 110 | 120 | 140 | 130 |
| Elongation at break (%) | | | 6.0 | 2.4 | 2.5 | 2.4 | 2.2 | 1.6 |
| Impact strength (kJ/m$^2$) | | | 80% normal | 25 | 25 | 23 | 25 | 20 |
| CTI, CTI(M) | 525, 225 | 500, 400 | 600, 600 | — | 600, 550 | 600, 525 | 600, 535 | 600, 550 |

*) for comparison

Polyamide 6,6 (polyhexamethyleneadipamide) having a viscosity number of 151 ml/g, corresponding to a relative viscosity ηrel of 2.7 (measured in 96% strength by weight $H_2SO_4$ as 0.5% strength by weight solution at 25° C. according to ISO 307).

Component A/2

Polyamide 6 (poly-ε-caprolactam) having a viscosity number of 145 ml/g.

Component B

Melamine cyanurate (Chemie Linz, AT) having a particle size ($d_{50}$) of 69 μm.

Component C

Magnesium hydroxide treated with aminosilane (Magnifin® H 10B from Martinswerke GmbH, DE)

Specific surface area (BET): 7.5–9.5 m$^2$/g

We claim:

1. A flameproofed thermoplastic molding material containing
   A) from 40 to 98% by weight of a thermoplastic polyamide,
   B) from 0.5 to 30% by weight of melamine cyanurate,
   C) from 0.5 to 50% by weight of magnesium hydroxide,
   D) from 1 to 50% by weight of a fibrous or particulate filler or of a mixture thereof which differs from B) and C) and
   E) from 0 to 30% by weight of conventional addiitives or processing assistants.

2. A flameproofed thermoplastic molding material as defined in claim 1, containing
   from 50 to 89% by weight of A), from 1 to 20% by weight of B), from 5 to 40% by weight of C) and from 5 to 35% by weight of D).

3. A flameproofed thermoplastic molding material as defined in claim 1, in which component D) is composed of glass fibers or wollastonite or kaolin or a mixture thereof.

4. A flameproofed thermoplastic molding material as defined in claim 1, in which component A) is composed of polyamide 6, polyamide 66 or polyamide 6/6T or a mixture thereof.

5. A flameproofed thermoplastic molding material as defined in claim 1, in which component C) is a magnesium hydroxide pretreated with a silane compound.

6. A molding obtained from a flameproofed thermoplastic molding material as defined in claim 1.

7. A flameproofed thermoplastic molding material as defined in claim 1, containing from 60 to 70% by weight of A), from 5 to 20% by weight of B), from 10 to 30% by weight of C) and from 10 to 20% by weight of D).

* * * * *